Inventors:
Luther A. Watters.
Samuel F. Lloyd.
By H. G. Fletcher atty.

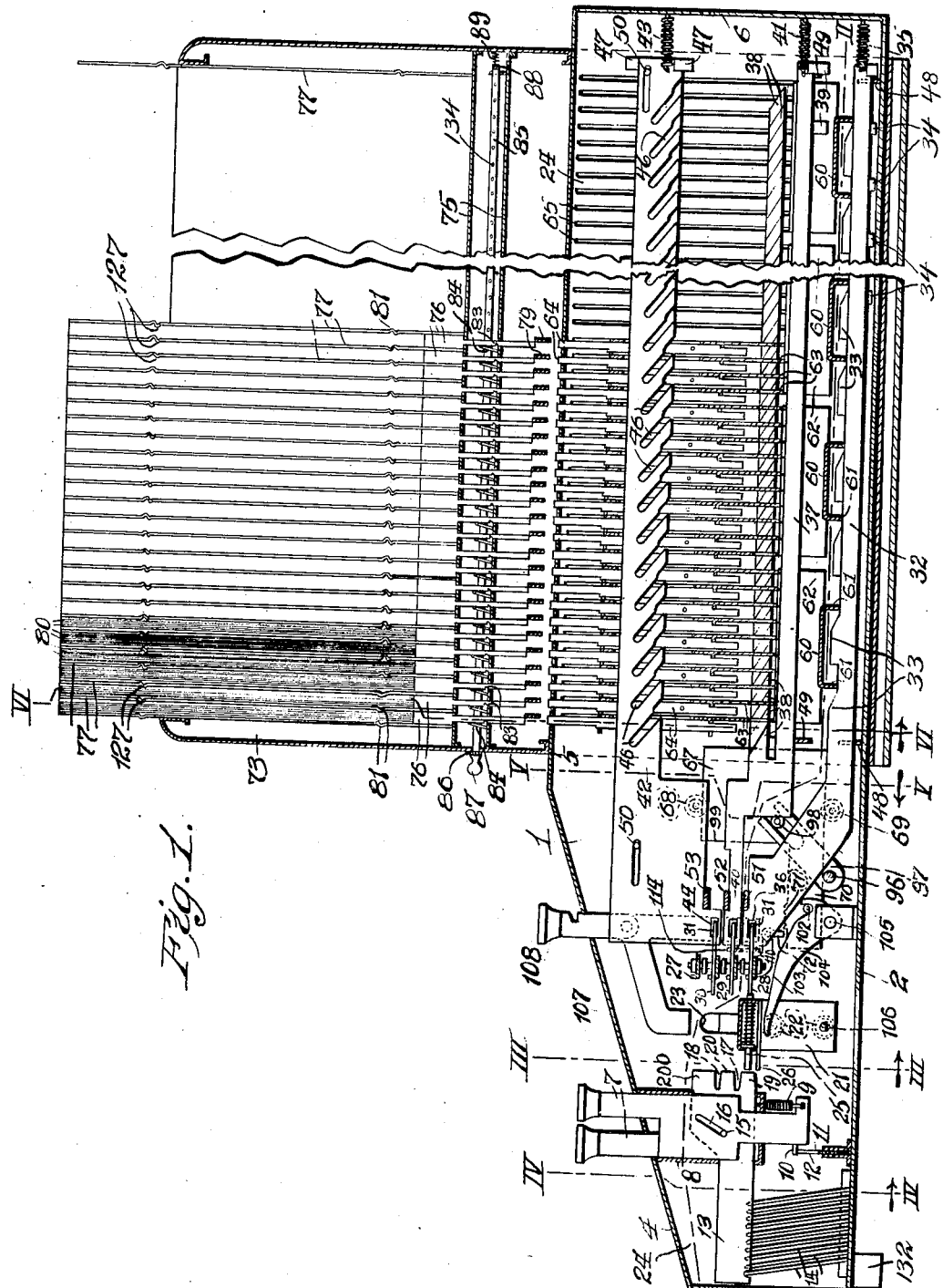

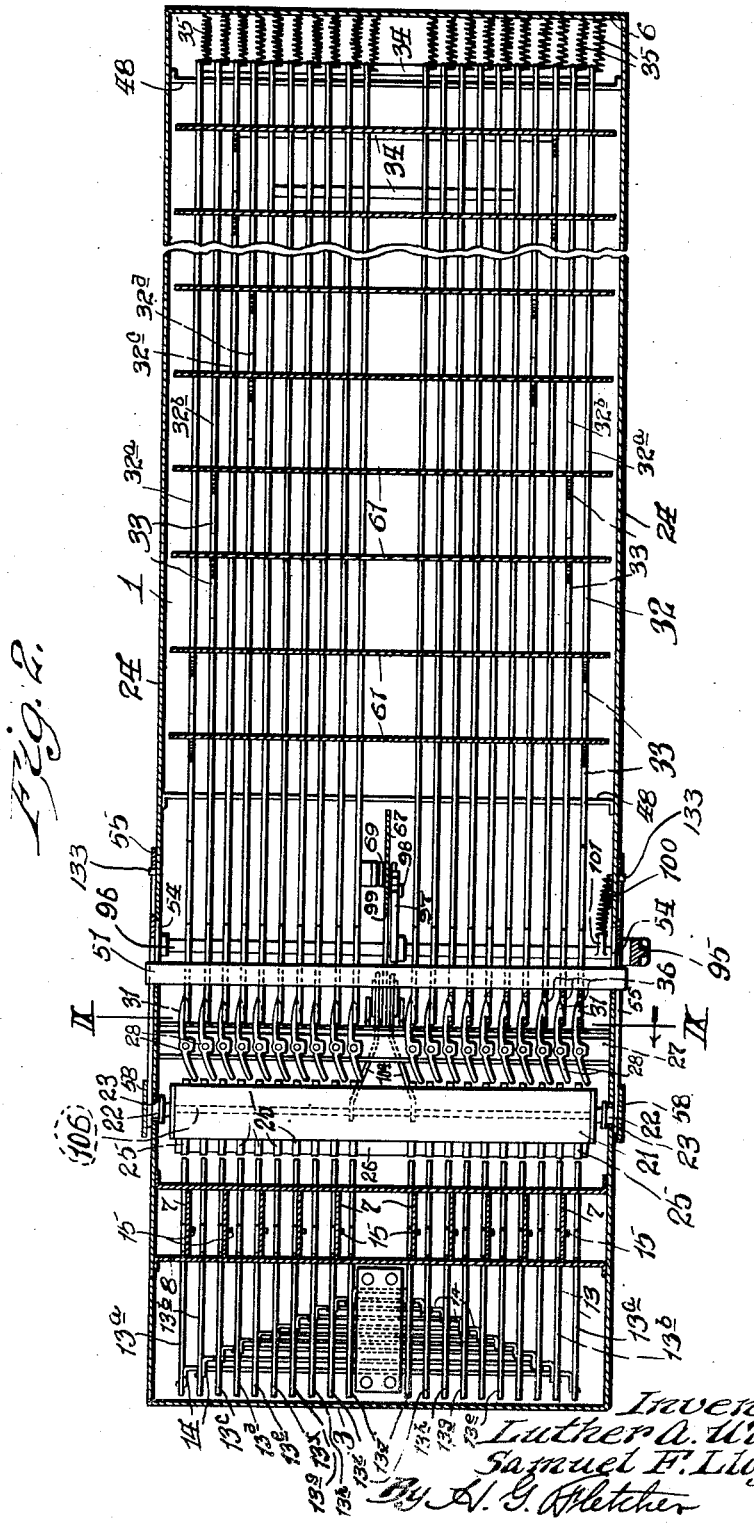

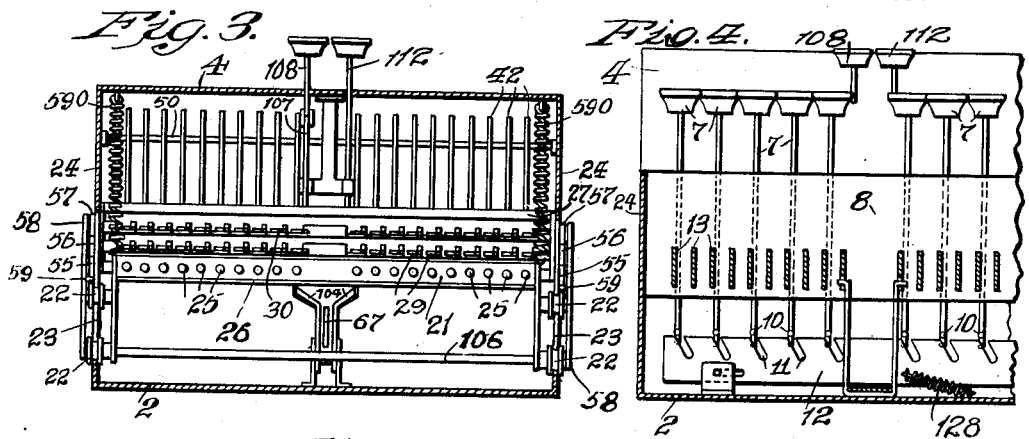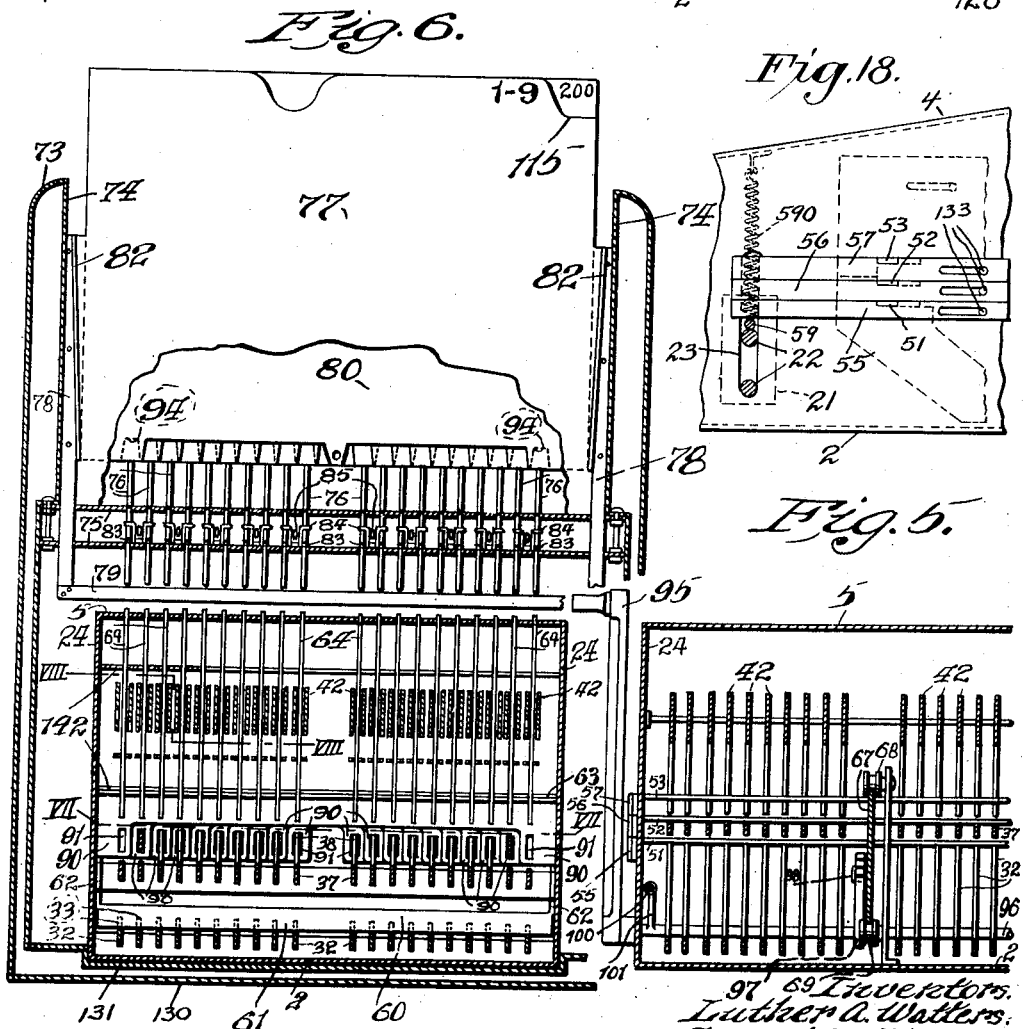

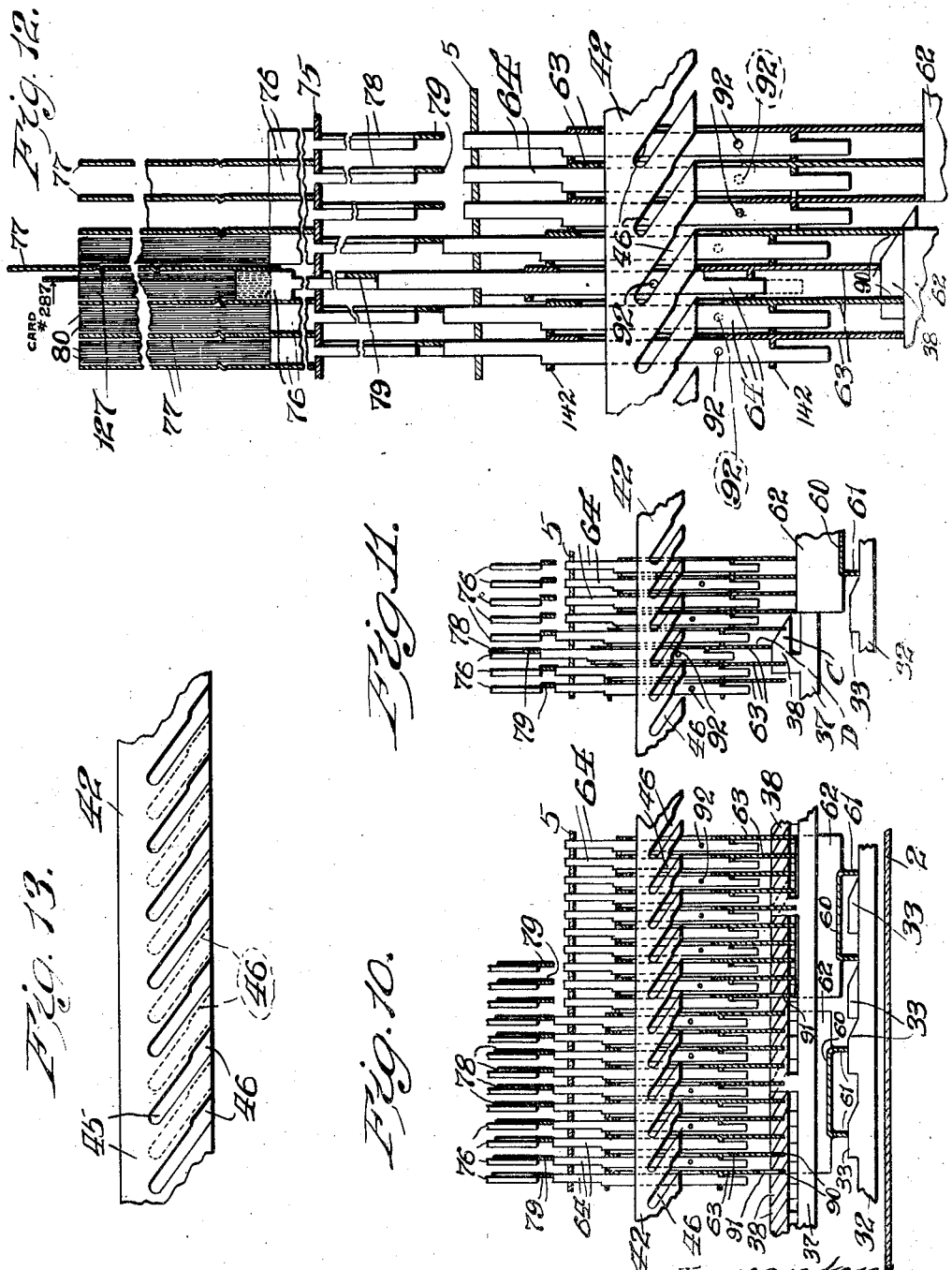

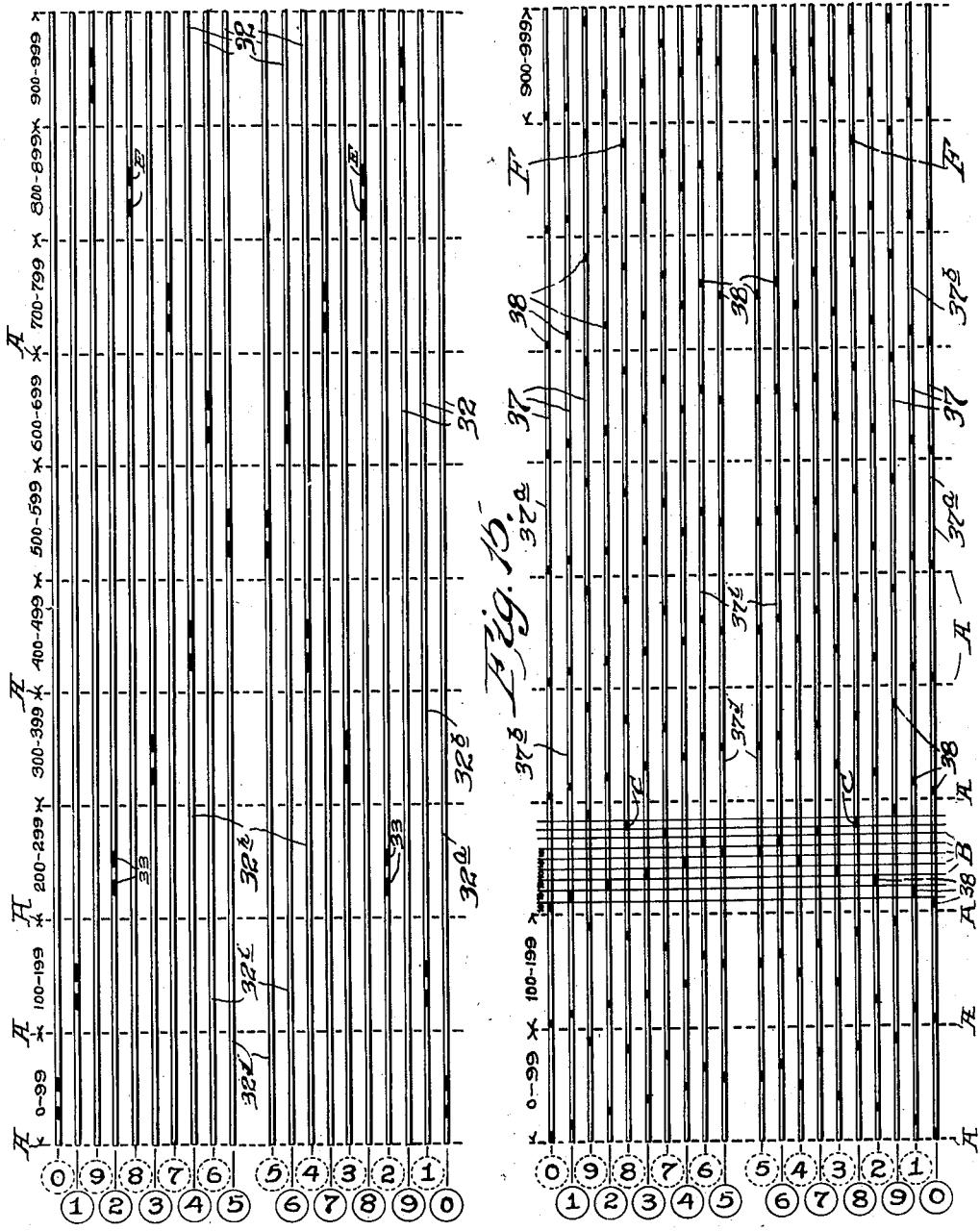

Oct. 15, 1929. L. A. WATTERS ET AL 1,731,281
SELECTING DEVICE FOR CARD ACCOUNTING SYSTEMS OR THE LIKE
Original Filed Jan. 24, 1917 7 Sheets-Sheet 7

Inventors:
Luther A. Watters.
Samuel F. Lloyd.
By H. G. Fletcher atty.

Patented Oct. 15, 1929

1,731,281

UNITED STATES PATENT OFFICE

LUTHER A. WATTERS, OF ST. LOUIS, MISSOURI, AND SAMUEL F. LLOYD, OF EDWARDS-VILLE, ILLINOIS, ASSIGNORS, BY MESNE ASSIGNMENTS, TO REMINGTON RAND INC., OF NEW YORK, N. Y., A CORPORATION OF DELAWARE

SELECTING DEVICE FOR CARD ACCOUNTING SYSTEMS OR THE LIKE

Application filed January 24, 1917, Serial No. 144,317. Renewed January 23, 1925.

This invention relates to an apparatus and system for finding accounts.

In various systems, such as modern accounting systems, it is of advantage to provide mechanism whereby an account can be readily found. These accounts are usually arranged in accordance with a given system, such as the decimal or numerical system, in which a given number of accounts, such as a thousand, is divided into successive groups, (hundreds) the groups divided into successive divisions or units (tens), and the divisions or units divided into successive cards or digits.

One of the objects of this invention is to provide a selecting device that is capable of operating on a plurality of closely packed cards of an accounting system, in which any desired card can be selected from the plurality of cards of the system.

Another object of this invention is to provide a selecting device, having ten operating keys, that is active on a plurality of cards of an accounting system of one thousand cards or less, in which any card of the system can be selected by three single key movement, or by three key movements of the same key, or by two key movements of the same key and one single movement of another key.

A further object is to provide a selecting device relative to a plurality of accounting cards in which any desired card of the plurality of cards, when operated on by the selecting device will be immediately moved to an off-set position from the other cards.

A still further object is to provide an accounting card of such a construction or design so that the same can cooperate with a selecting device relative to selecting a desired card from a number of cards of similar construction.

Other and further objects will appear in the specification, and be specifically pointed out in the appended claims, reference being had to the accompanying drawings exemplifying the invention, and in which, Figure 1 is a longitudinal section of this improved card selecting device having an intermediate portion thereof broken away.

Figure 2 is a horizontal section taken on the line II—II of Fig. 1.

Figure 3 is a transverse section taken on the line III—III of Fig. 1.

Figure 4 is a transverse section taken on the line IV—IV of Fig. 1.

Figure 5 is a fragmentary transverse section taken on the line V—V of Fig. 1.

Figure 6 is a transverse section taken on the line VI—VI of Fig. 1.

Figure 10 is a fragmentary section showing the position of some of the parts caused by the action of a first key operated on.

Figure 11 is a fragmentary section showing the position of some of the parts caused by the action of the operation of a second key.

Figure 12 is a fragmentary section showing the position of some of the parts caused by the action of the operation of a third key, in which is shown the desired card, off-set or lifted from the other cards.

Figure 13 is a fragmentary view of a portion of one of the third or last selector bars.

Figure 14 is a diagrammatic view of the lowermost or first set of selector bars.

Figure 15 is a diagrammatic view of the intermediate or second set of selector bars.

Figure 18 is a detail side elevation showing the stops or filling members for controlling the position of the transmitter carriage.

Figure 7:
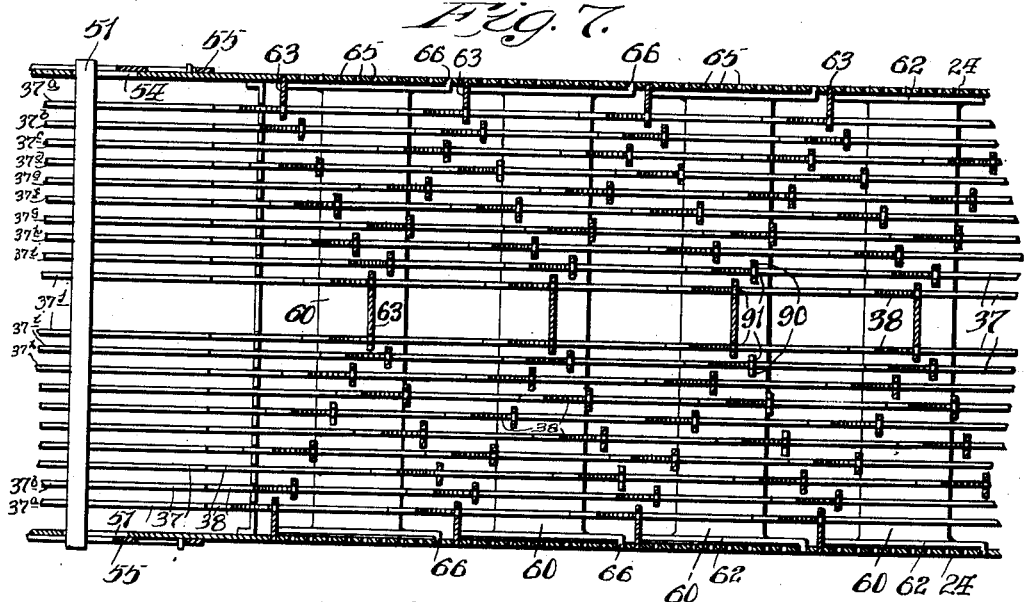
Figure 7 is a fragmentary horizontal section taken on the line VII—VII of Fig. 6.

In many of the views parts have been omitted; this has been done to promote clearness, for if all of the parts behind a plane at which a view is taken were shown, they would obscure the particular mechanism under consideration.

In the specification and claims, the term "card" is used in its broadest sense, so as to cover ordinary cards, loose leaves, sheets and other accounting elements. Similarly, the word "tray" is used in its broadest sense, so as to include the various forms of holding means or receptacles, adaptable for the holding, retaining or segregation of accounts.

Since card accounting systems arranged in numerical order are now used extensively in modern business establishments, said systems have grown to such a size that considerable time is lost by the bookkeeper or accountant in locating a desired card. This invention therefore is to provide a mechanical selecting device for instantly locating and setting up the desired card above or from a plurality of cards to a position in which the desired card can be easily grasped and removed for inspection.

Referring to the drawings, 1 designates a lower mechanism retaining housing having a bottom 2, front wall 3, sloping top wall 4, flat top wall 5 and rear wall 6. Vertically arranged in the front portion of the housing 1 and having their upper ends extend through the sloping top 4 are a series of depressing keys 7, said keys being numbered in numerical order from one to nine and cipher, the intermediate portions of said keys being slidably secured in a casing 8 which is located in the housing 1. Connected to the lower end of each key 7 is a coil spring 9, each of said springs having their upper ends secured to the lower end of the casing 8.

Secured adjacent the lower end of each key is a stop pin 10, said pins being operably related to the slots 11 which are formed in the slidably mounted key stop bar 12, and there being a spring 128 secured to said bar and to the bottom 2 of the housing 1. Slidably mounted in the casing 8 are a plurality of horizontally arranged plunger actuating members 13. As shown in the drawings, there are twenty members 13, said members being arranged in pairs as designated by $13^a$, $13^b$ and so forth, each pair of bars being coupled together by a U-shaped swingingly mounted member 14, one member 13 of each pair carrying a pin 15, each pin of each pair of members 13 being engaged in an inclined slot 16, there being a slot 16 formed in each of the keys 7.

Formed in one end of each of the members 13 are a pair of expanding slots 17 and 18, said slots forming plunger engaging portions, 19, 20 and 200. Located in the housing 1 adjacent the members 13 is a transversely arranged plunger carrier 21, said carrier being adapted to vertical travel and carrying a pair of rollers 22 on each end thereof, each pair of rollers being mounted in a vertically formed trackway 23, there being a trackway formed in each of the side walls 24 of the housing 1. Horizontally arranged in the carrier 21 are a plurality of spring actuated plungers 25, there being a plunger for engagement with each of the members 13. Formed on said carrier 21 beneath the forward end of the plungers 25 is an arresting ledge 26 adapted to enter the slots 17 and 18 respectively. Transversely arranged in the housing 1 rearwardly of the carrier 21 is a trigger support 27, and pivotally mounted in said support are a plurality of horizontally arranged spring actuated triggers, said triggers being arranged in rows, one above the other, in which the triggers of each row are in vertical alinement with one another, the triggers in the first and lower row being designated by the numerals 28, whereas the second row of triggers are designated by the numeral 29, and a third and uppermost row being designated by the numerals 30.

Formed on the rear end of each of the triggers 28, 29 and 30 is a hook shaped portion 31. Longitudinally arranged in the housing 1 adjacent the bottom thereof is a plurality of primary or group selector bars 32, each of said bars having a pair of elevating portions 33 formed thereon, said bars being arranged in pairs as designated by $32^a$, $32^b$ and so forth, each pair of selector bars being secured together adjacent their rear ends by a cross member 34, each selector bar having a spring 35 secured adjacent its rear end, said springs being secured to the rear wall 6 of the housing 1.

Formed in the front end of each of the selector bars 32 is an opening 36, said openings being for the reception of the hooked portions 31 of the first set of triggers 28. Mounted above and in vertical alinement with the selector bars 32 are a plurality of longitudinally arranged secondary or division selector bars 37, each of said bars having a series of elevating members 38 formed thereon, said bars being arranged in pairs, such as $37^a$, $37^b$ and so forth, each pair of bars being tied together by a cross bar 39, there being a plurality of said cross bars arranged in any suitable manner similar to the cross bars 34 as shown in Figure 2, in which each cross bar 39 will tie its respective pair of selector bars. Secured to the rear end of each of the bars 37 and to the rear wall 6 of the housing 1 is a spring 41. Formed in the forward end of each of the bars 37 is an opening 40, said opening being adapted to be engaged by the hooked portions of the triggers 29. Mounted above the selector bars 37 are a plurality of tertiary or element selector bars 42, and attached to the rear end of each of said bars and to the end wall 6 is a spring 43, and formed in the forward end of each bar 42 is an opening 44, said openings being for the reception of the hooked ends of the triggers 30.

Figure 8:
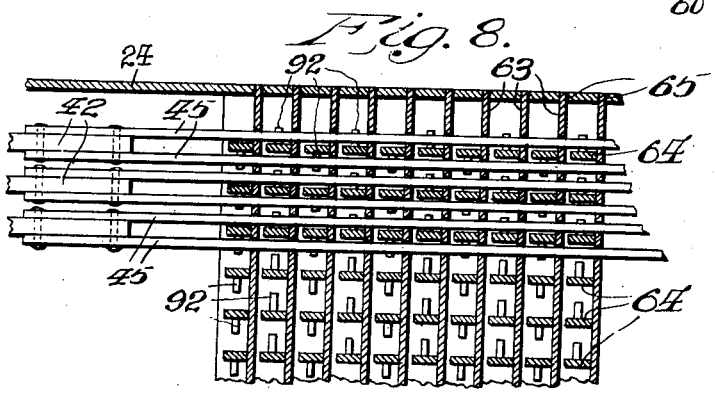
Figure 8 is an enlarged fragmentary horizontal section taken on the line VIII—VIII of Fig. 6.

Referring to Figures 8 and 13 each selector bar 42 comprises a pair of parallel members 45, and formed in each of said members 45 are a series of inclined throats 46, each throat of one of the members 45 being in staggered relation to each throat of the other member 45.

The selector bars 42 are arranged in pairs as are the selector bars 37 and 32, each pair of bars 42 being tied together by a cross bar 47, each pair of said cross bars 47 being arranged in any suitable manner relative to tying their respective pairs of selector bars together so that said cross bars will pass without striking one another as the pairs of selector bars 42 are moved. These selector bars 32, 37 and 42 are slidably mounted, said bars being slidably supported by the guiding members 48, 49 and 50, respectively. Engaging against a portion of the forward end of each of the selector bars 32, 37 and 42 are resetting bars 51, 52 and 53 respectively, said resetting bars having their ends extend through an opening 54 which is formed in each side wall 24 of the housing 1. Located on the outside of each of the side walls 24 and secured to each end of the resetting bars 51 is a filling member 55. Slidably mounted above each of the members 55 is a filling member 56, said members 56 being secured to the ends of the resetting bar 52. Slidably mounted above each of the members 56 is a filling member 57, said members 57 being secured to the ends of the resetting bar 53. The members 55, 56 and 57 are guided on the side walls 24 by slots in the members engaging pins 133 on the walls. Secured to each end of the plunger carrier 21 is an upright guiding member 58, and formed on each of said members 58 is a stop 59, said stops normally engaging against the under side of each of the filling members 55, and secured to the carrier 21 and to the sloping top of the housing 1 are a pair of springs 590.

Mounted above the selector bars 32 are a plurality of primary or group carriers comprising transversely arranged lifting members 60, each of said lifting members having a pair of runners 61 formed thereon, and formed on the ends of each of said members 60 is a shallow vertically extending portion 62.

Mounted and resting on the extending portions 62 of each of the primary carriers or lifting members 60 are a plurality of vertically reciprocating secondary or division carriers comprising plunger or selector element supporting members 63. Slidably mounted in each of said plunger-supporting members 63 are a plurality of vertically arranged plungers or selector elements 64, said plungers having their upper ends extending through the flat top wall 5 of the housing 1, and being guided by slotted flanges 142 on the secondary carriers. The ends of said plunger-supporting members 63 are slidingly supported in vertically formed slots 65 which are formed in each of the side walls 24 of the housing 1. The right-angular bent portions 66 of the vertically extending portions 62 of each of the lifting members 60 are also slidably mounted in the slots 65.

It will, therefore, be seen that there are provided a series of ten primary carriers, each of which is mounted for elevating movement in the sides 24 to be selectively elevated by the primary selector bars 32; that mounted on and resting on each of these primary carriers are a series of secondary carriers 63 also guided for movement in the sides 24 and which are arranged for selective elevation by a series of secondary selector bars 37; and that mounted on each of these secondary carriers are a series of ten pairs of selectors 64, also guided on the secondary carriers and which are arranged for selective elevation by the tertiary selector bars 42. The primary and secondary carriers, as well as the selectors, are held in normal position by gravity, and after being elevated are restored by gravity action.

Centrally and vertically arranged in the housing 1 rearwardly of the resetting bars 51, 52 and 53 is a pusher block 67, said block being movably supported by an upper grooved roller 68 and a lower grooved roller 69. Formed on said block is a forwardly extending portion 70, and formed on the upper edge of said portion 70 are a number of ratchet teeth 71. Swingingly mounted on support 27 above said teeth 71 is a pawl 72.

Mounted over and around the housing 1 is a card supporting casing or tray 73, having vertically formed supporting walls 74. The outside walls of the casing 73 extend downwardly and are joined to a base 130, while the inside walls also extend downwardly and are joined to a base 131 provided with a depressed portion in which rests the base 2 of the housing 1, as shown in Fig. 6. The housing 1 is suitably secured in position in the casing 73 and feet 132 may be provided for the other end of the housing 1. Secured to intermediate flanges formed in said walls 74 are a pair of spaced apart horizontally arranged super-plunger supports 75. Slidably mounted in said supports 75, are a plurality of vertically arranged super-plungers 76, said plungers being arranged in transverse and longitudinal order, and in vertical alinement with the plungers 64, which are carried by the plunger-supporting members 63.

Mounted transversely between the vertical walls 74 of the card case 73 are a plurality of pilot cards 77. Secured adjacent the side edges of each of said pilot cards 77 is a depending leg 78, each of said legs passing through openings formed in the plunger supports 75. Secured to the lower ends of said legs is a transversely arranged cross bar 79, these pilot cards 77 are spaced apart, forming pockets, and are for the reception of a pack of ten index cards 80, the bottoms of said cards resting on the tops of the super plungers 76. Transverse ribs 81 are formed on each of the pilot cards 77, said ribs being for the purpose of stiffening the pilots transversely and for preventing the outer cards 80 of each pack of ten cards from getting in between the super-plungers 76 and their respective pilot cards 77.

Secured to each end of each pilot card 77 is an upwardly inclined wall 82, said inclined walls being for the purpose of entraining each pack of cards 80 to a proper seating position to the super-plungers 76. Formed in each of the super-plungers 76 is a spring-engaging notch 83, and located adjacent each of said plungers between the supports 75 is a spring retainer 84 the turned ends of which engage the notches in a pair of plungers.

Longitudinally arranged between successive pairs of rows of super-plungers 76 is a releasing member 85 each of which has a series of cross pins 134 arranged to trip the retainers, said members 85 being connected together at their forward ends by a cross member 86, to which is secured an engaging portion 87. Tying the rear ends of the spring releasing members 85 together is a cross member 88, and secured to said member and to the rear wall of the card case 73 is a spring 89.

From the aforesaid description, and the disclosure shown in the drawings, it is evident that the operating mechanism and the card supporting casing contemplates the handling of one-thousand index cards relative to finding any desired card or cards out of the solid pack of one-thousand cards, it of course being understood that the cards are numbered in numerical order. This lot of one-thousand cards is divided in sets of ten, each set being separated from adjacent sets by a movably mounted pilot card 77, and when all of the cards are in their neutral positions and resting on their respective super-plungers 76, and the pilot cards are in their neutral or lowered position, the tops of said index cards and said pilot cards are flush.

In selecting a desired card, it is the intent of this invention to produce the desired card by elevating the upper portion of the desired card above the other cards so that the desired card is in a position to be grasped and pulled out for inspection by the operator. It is also essential that means be provided whereby the card that has been removed can be returned to its proper seating place among the remaining cards. To fulfill this want, the pilot cards 77 are so arranged that each pilot card will be rearward of each set of ten cards and operably related thereto, so that when the desired card is elevated, the pilot card relating to the set of ten from among which the desired card is being selected will also be moved upwardly so that a portion thereof will extend above the remaining index cards and pilot cards.

In order to proceed with the operation relative to producing a desired index card, it is necessary to operate three different sets of mechanism pertaining to the actuating of three of the sets of primary, secondary and tertiary selector bars 32, 37 and 42 respectively, and as afore related, said selector bars are arranged in pairs, each set of selector bars 32 being capable of applying the initial or primary movement to a number of the plungers or selector elements 64 so that said plungers will be in a position of operation relative to being active towards carrying on the operation pertaining to a group of one-hundred cards of the one-thousand cards.

Inasmuch as there are twenty of the selector bars 32 arranged in pairs, it is therefore seen that each pair of selector bars is adapted to control a set of plungers 64 which relate to the manipulation of a group of one-hundred cards being differently numbered, for instance such as cipher to ninety-nine, one-hundred to one-hundred-ninety-nine, two-hundred to two-hundred-ninety-nine, etc., to nine-hundred-ninety-nine, making a set of one-thousand cards, each division of one-hundred cards being divided by the dotted lines A, as shown in the diagrammatic view, Figure 14, which related to the lowermost or first selector bars 32. The disclosure shown in Fig. 15 is a diagrammatic view pertaining to the secondary selector bars 37, said selector bars as afore related being arranged in pairs, each selector bar having an elevating member 38 formed thereon, and as shown in said figure, the dotted lines A, which designate spaces for one-hundred cards are subdivided by the lines B, thereby making ten spaces, each space relating to a set, division or unit of ten index cards and its respective pilot card, and it being noted that each pair of elevating members 38 of each pair of selector bars 37 are in a position relating to a set, division or unit of ten cards.

In this connection, when a pair of selector bars 37 are operated subsequent to a set of selector bars 32 being operated, said set of selector bars 37 are capable of providing a further operation on a number of plungers or selector elements 64 of the group of plungers 64 which were previously operated on by the aforesaid bars 32, said operated pair of selector bars 37 causing a number of plungers 64 to be moved to a position in readiness for activity on ten index cards.

From the aforesaid, it is to be seen that the procedure relating to the finding of a desired card is a procedure of elimination, in which it is first necessary to primarily elect what hundred group the desired card is in, and then secondly to secondarily elect in what set division or unit of ten cards out of the group of one-hundred cards the desired card is in, after which it is necessary to operate a pair of the tertiary or last selector bars 42, said elected pair of bars 42 being capable of electing a pair of the plungers or selector elements 64 of the number of plungers that were actuated by the selector bars 32 and 37 respectively.

Figure 16:
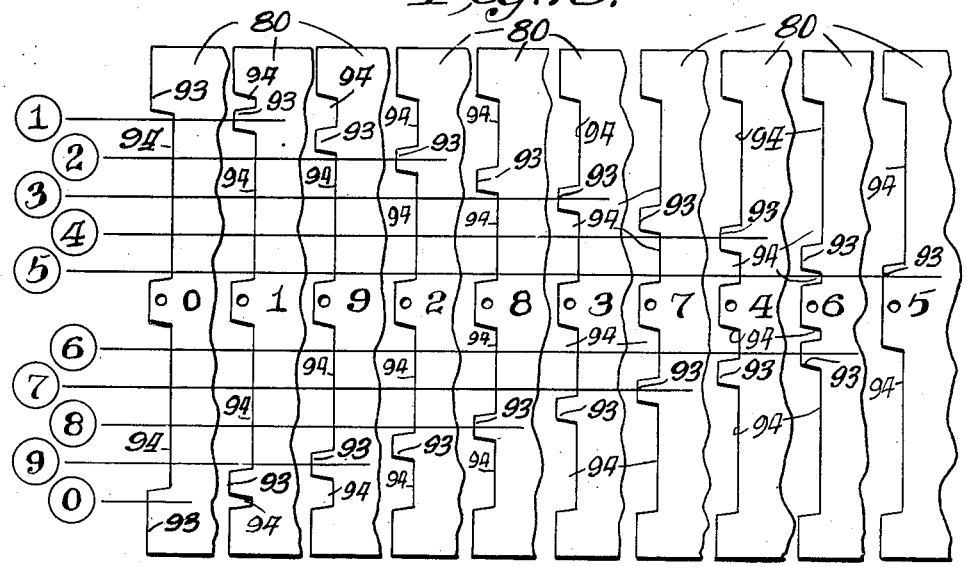
Figure 16 is a diagrammatic view showing the construction of the lower portions of a set of ten cards and their operative relation to the ten operating keys.

For the purpose of further illustration before going into the operation of the mechanism pertaining to the finding of a card or a number of cards, attention is again called to Figures 14 and 15, and to Figure 16, which shows the operative relation of the operating or numeral keys 7 numbering from one to nine and cipher, each numeral key being operably related to a pair of selector bars, the numerals in the dotted circles of said Figs. 14 and 15 being shown to assist in tracing the pairs of selector bars operable by their respective numeral keys. The figures 0–99, 100–199, etc., as shown in Figs. 14 and 15 represent groups of the index cards in which each card is numbered in order, such as cipher, one, two, and so on to card nine-hundred-ninety-nine, thereby making a total of one-thousand cards. In carrying out the operation of this improved selecting device, let it be assumed that card number two-hundred eighty-seven is required, and as shown in Fig. 1, the numeral key two, which is designated as one of the keys 7, upon being depressed as a primary key, will cause a pair of plunger-actuating members 13, that are operably related to said key, to be moved rearwardly, and inasmuch as the plungers 25 are in alinement with the plunger-engaging portions 19 of said members 14, a pair of relatable plungers 25 will be moved forwardly, thereby engaging a pair of triggers 28, and releasing said triggers from engagement with a pair of the lowermost primary selector bars 32, and inasmuch as said bars are spring-actuated, said bars will be drawn rearwardly, and as said bars are related to the numeral key 2, the elevating portions 33 thereof will be engaged against the runners 61 of one of the lifting members or primary carriers 60, and inasmuch as said lifting member 60 is adapted to elevate the plunger-supporting members or secondary carriers 63, the plungers 64 carried by said members 63 will be elevated, see Fig. 10.

As the pair of primary selector bars 32 move rearwardly, said bars also carry the resetting bar 51 rearwardly, and inasmuch as the filling members 55 are secured to said resetting bar 51, said filling members 55 are withdrawn from engagement with the stops 59 of the plunger carrier 21. At this time, however, the lugs or portions 19 lie over the ledge 26, so that movement of the carrier 21 is prevented until the actuator 13 is again retracted upon release of the key, at which time the carrier is released, thus allowing the plunger carrier to be drawn upwardly by the springs 590 until said stops 59 engage the filling member 56. This upward movement of the plunger carrier will place the plungers thereof in alinement with the plunger-engaging portions 20 of the plunger-actuating members 13.

The numeral key 8 is then pressed downwardly as a secondary key, causing a pair of the plunger-actuating members 13, that are operably related thereto, to be moved rearwardly, and the plunger-engaging portions 20 of said members 13 will engage their respective plungers 25, thereby moving said plungers rearwardly, and tripping a pair of the second-row triggers 29, thereby disengaging said triggers from engagement with a pair of the second set of selector bars 37, and allowing said pair of selector bars to be moved rearwardly. From an inspection of Fig. 10, it will be noted that the action of the rearward travel of the pair of selector bars 32 caused a set of ten supporting members or secondary carriers 63 to be elevated. In this position, the openings 91, which are formed in the engaging portions 90 of the elevated members 63, will be placed above an alining position with the elevating members 38 of the selector bars 37, and inasmuch as only a pair of the selector bars 37 are caused to be moved rearwardly by the action of the manipulation of the numeral key eight, an adjacent elevating member C of each of said bars will be engaged beneath adjacent or opposing portions 90 of the plunger-supporting member 63 which is designated as D, see Fig. 11. Since other elevating portions 38 other than the aforesaid elected elevating members C are carried by each of the selector bars 37 and were moved rearward, said other elevating members C on account of being in alinement with the openings 91 of the engaging portions 90 travel into their respective openings, thereby being inactive towards elevating the undesirable plunger-supporting members 63. As the aforesaid pair of selector bars 37 were moved rearwardly, the resetting bar 52 was carried thereby, which in turn caused the filling members 56 to be withdrawn from engagement with their respective stops 59 of the plunger carrier 21. At this time, however, the ledge 26 is in the recesses 17, so that the carrier is retained by the lugs 20 until the actuators 13 have again been withdrawn upon the release of a key, whereupon the carrier is released, thereby allowing said carrier to be moved upwardly until arrested by engagement of the stops 59 with the filling members 57.

It is to be noted that when the aforesaid supporting member 63 was singled out as one among ten, the pins 92, one of which is carried by each of the plungers 64, were elevated to a position in which each pin is engaged in a throat 46 of the selector bars 42. Since as just related, the numeral keys two and eight have been manipulated relative to the producing of the card numered two-hundred-eighty-seven, the numeral key seven is next in order to be depressed as a tertiary key, and upon actuation will cause a pair of the plunger-actuating members 13, that are operably related to said key, to be moved rearwardly, and inasmuch as the plungers 25 of the plunger carrier 21 are in alinement with the plunger-engaging portions 200 of the members 13, a pair of relatable plungers 25 will be moved rearwardly, thereby engaging an alining pair of triggers 30, and releasing said triggers from engagement with their respective selector bars 42. Since said bars are spring actuated, they will be moved rearwardly and the lower inclined faces of a pair of the throats 46, in which the aforesaid pins 92 of the plunger or selector element 64 are in engagement, will engage against their respective pins, thereby further elevating a pair of the plungers 64.

Upon the tertiary depression of the key, the ledge 26 has entered the recess 18, so that the carrier is retained against movement by the lugs 200 until the key is again released, whereupon the actuators 13 being retracted, will cause release of the carrier, permitting its springs 590 to elevate it an additional step, this carrier being finally arrested by a stop such as 107.

Returning again to an inspection of Fig. 10, it is to be noted that when a number of plungers were first elevated the upper ends of said plungers were placed in approximate engagement with ten of the cross bars 79 of respective pilot cards 77. In the second operation of elevation of a number of the plungers 64, from an inspection of Fig. 11, it is to be seen that one of the pilot cards has been elevated, and the plungers which raised said card are in approximate engagement with the lower ends of a number of the transversely arranged super-plungers 76. In Fig. 12, which shows the third operation relative to the elevating of the finally selected plungers 64, of which there are a pair, it is to be noted that said pair of plungers and the pilot card have been elevated together. This third and final elevating of the remaining plungers 64 on a pair of the super-plungers 76 caused the required card number two-hundred-eighty-seven to be elevated a distance above the remaining cards as is shown in Fig. 12.

By way of recapitulation relative to the action of the pair of super-plungers 76 on a card, it is well to note that on account of the selector bars and parts relating thereto being arranged in pairs, that the plungers or selector elements 64, and superplungers 76 are also arranged in pairs so that when the last or third pair of selector bars 42 are operated, a pair of the plungers 64 are caused to act on a pair of vertically alining super-plungers 76. These super-plungers 76 are of a width to approximately fill in the space between a pair of pilot cards 77, as well as being of a width equal to the thickness of a set of ten units or cards 80. Therefore in order to finally move one card from among a pack of ten cards, it has been found necessary, relative to this disclosure of operating mechanism, to provide the lower edges of the index cards 80 with a construction similar to that as shown in Fig. 16, in which there are a pair of abutting portions or tabs formed on each card as is shown at 93, said abutting portions 93 of each card being offset or out of longitudinal alinement with the abutting portions of the other cards of a pack or unit of ten cards. With this formation on the bottom of the cards, as shown, when the cards are packed together, as shown in Fig. 6, one pair only of super-plungers 76 is capable of operating a particular card of a set of ten cards, in which each of the plungers of said pair of plungers will engage their respective abutting portions 93 of the respective card when the super-plungers are operated in pairs each pair during their vertical travel coming in contact with only a pair of abutting portions 93. The diagrammatic view as shown in said Fig. 16, in which the lower ends of the cards are shown, and in separated positions, bearing out the aforesaid, in which the abutting portions 93 of each card are so arranged so as to cooperate only with their respective keys.

During the operation of a pair of super-plungers on a card, it is to be noted that each plunger in its upward travel is adapted to idle movement relative to the elevating of the nine other cards. In this connection, recesses 94 are provided in communication with aforesaid abutting portions 93 of a pack of ten cards, when said cards are packed relative to one another, (see the lower ends of the cards in Fig. 6).

After the desired card has been withdrawn from its place among its respective pack for inspection, and it is desired to return the same its proper place, the user of the card will have no trouble finding the desired location of deposit on account of the fact that the pilot card 77, which was elevated with the desired card, is still protruding from above the other cards, and it is preferable that the user, upon replacing the card, should engage the card in front of and adjacent the outstanding pilot card.

Assuming that the user is returning card number two-hundred-eighty-seven to its place of deposit, and engages said card against the outstanding pilot card, upon moving said card downward, the same will be forced between card number two-hundred-eighty-nine and the pilot card, which position of deposit will place card number two-hundred-eighty-seven out of numerical order. This irregular disposition of card number two-hundred-eighty-seven is immaterial, and in fact is not a displacement relative to this improved card selecting device, as the same can immediately be found or offset from the other cards upon further manipulation of operating keys two, eight and seven, as the pair of super-plungers 76, pertaining to said card will always be in engagement with the portions 93 of said card on account of the fact that the width of the super-plungers are wider than a pack of ten cards. When a pair of super-plungers 76 were elevated relative to actuation on a card, the springs 84, relative to each of said plungers, are engaged in their respective notches 83 of said plungers said springs being for the purpose of holding said plungers in their elevated positions relative to the holding of the card.

From the aforesaid, relative to the finding of card number two-hundred-eighty-seven, it is readily seen that three key operations are necessary to find any desired card, for instance, assuming card number eight-hundred-eighty-eight is desired, the numeral key eight operated as a primary key, will release the pair of primary selector bars 32 that are designated by the diagrammatic keys eight, (see Fig. 14), and the elevating portions 33 carried thereby, which are designated by E, said members E becoming active towards elevating the plungers 64 of the plunger-supporting members 63, all of said plungers pertaining to the section containing the cards from eight-hundred to eight-hundred-ninety-nine. The numeral key eight is again but secondarily depressed, thereby releasing a pair of the secondary set of selector bars 37, said bars being diagrammatically designated by the key numeral eight, as shown in Fig. 15, the elevating portions F thereof becoming active towards elevating one of the other nine plunger supports 63 from above the other nine plunger supports.

The numeral key eight is then depressed for a third time, thereby actuating a pair of the tertiary set of selector bars 42, said pair of bars causing a pair of the plunger or selector elements 64 to contact with a respective pair of super-plungers 76, thereby elevating card eight-hundred-eighty-eight.

If it is desired to select a card from the set of one-hundred cards from 0–99, and assuming that it is the cipher card that is desired, it will be necessary to depress the cipher key three times, whereas, if it is desired to obtain card number ten, it will be necessary to first press cipher key, second a key number one, thirdly cipher key; and if it is desired to obtain card number ninety-nine, it is quite evident that the number numeral keys to be operated will be cipher, nine, nine.

From the aforesaid it is readily seen that any desired card of a set of one thousand cards can be found after three operations on a key board of ten keys. After a desired card has been obtained, and in order to return all of the parts that were actuated to their neutral positions, the handle 95, which is mounted on the rock shaft 96 is pulled towards the operator, thereby actuating the bifurcated arm 97 which is mounted on said shaft 96, and inasmuch as the bifurcated portion of said arm 97 is engaged over the roller 98, which is carried by the pusher block 67, the front edge 99 of said block will be engaged against the resetting bars 51, 52 and 53 respectively, thereby returning said bars to their former positions, and inasmuch as there is a resetting bar for each of the selector bars 32, 37 and 42, said selector bars will be drawn to their former positions, and into engagement with their respective triggers 28, 29 and 30. In order to secure the proper resetting of the aforesaid selector bars 32, 37 and 42, the pawl 72 is adapted to be swung to a position so that the ratchet teeth 71, which are formed on the extending portion 70 of the pusher block 67 will be allowed to ride thereunder. If for any reason the operator fails to throw the handle 95 the intended limit, said handle will not be allowed to return to its position of rest on account of the fact that the pawl will engage against one of the teeth 71, and in this way the operator will know that he has not thrown the handle 95 to a resetting position.

Inasmuch as the arm 97 is always in engagement with the roller 98 of the pusher block, the spring 100, which is tensionally connected to the spring lever 101, which is secured to the shaft 96 will return said handle 95 and pusher block 67 to their neutral positions. As the pusher block 67 was moved forwardly relative to the resetting of the selector bars, a simultaneous downward movement was applied to the plunger carrier 21. This is brought about by reason of the rollers 102, one of which is carried on each side of the pusher block being arranged so as to be in juxtaposition to engage with the upper surfaces 103 of the twin levers 104 which are swingingly mounted at 105, so that said levers will ride on to said surfaces 103, thereby depressing said levers, and inasmuch as the cross bar 106 of said plunger carrier 21 is in the path of travel of the outer ends of said levers, said cross-bar will be engaged, thereby drawing said plunger carrier downwardly. As afore-related, this movement of the levers 104 is simultaneous with the resetting travel of the pusher block 67. Therefore the stops 59, which are mounted on the carrier 21 will be simultaneously lowered to a plane whereby the forwardly travelling filling bars 55, 56 and 57, in their returning travel, are adapted to be arranged above said stops and in their neutral positions. These filling members, when returned to their normal positions will hold the plunger carrier 21 in its neutral and lowermost position, in which the plungers thereof are in horizontal alinement with the lower row of triggers 28.

Referring again to the operation as related to the finding of card two-hundred-eighty-seven, it is to be noted that when the set of selector bars 42, which were the last set to be released relative to the operation of the numeral key seven, were operated, that the uppermost filling members 57 were also released. In this connection, after said filling members were released, the elevating springs 590 of the plunger carrier 21 elevated the carrier to a position in which the plungers thereof were above a horizontal plane with the uppermost set of triggers 30, in which position said plunger carrier is withheld from further vertical travel by its engagement with the outstanding arm 107 of the releasing member 108. This out-of-alinement position of the carrier 21 relative to the upper row of triggers 30 is for the purpose of preventing any further action of the numeral keys in the event that said keys are carelessly operated, for if any of said numeral keys are operated, the plunger-actuating members 13, which are automatically operated when the numeral keys are depressed, will be inactive towards operating any of the plungers relative to engagement with any of the triggers 30.

It will, therefore, be seen that in accordance with this invention, there are provided for a tray containing one thousand cards, two thousand pairs of selector elements 64, that is, a pair of such elements for each card, and corresponding to the identifying portions or characteristics 93 thereon. As previously described, the cards are arranged in groups of one hundred cards each, each group being divided into ten divisions or units of ten cards each, and each division or unit comprising, therefore, ten cards arranged in a compartment.

The selector elements 64 are also arranged in groups, divisions or units and elements, corresponding to the cards. Thus a series of ten primary carriers 60 are arranged along the tray, each carrier being arranged to support one hundred pairs of selector elements, and being mounted for elevating movement. Each primary carrier has mounted for elevating movement thereon, a series of ten secondary carriers 63, while each secondary carrier has ten pairs of selector elements mounted for elevating movement thereon. Each primary carrier is arranged to be elevated by a pair of primary selector bars 32, each secondary carrier 64 is arranged to be further elevated by a pair of secondary selector bars 37, while each pair of plungers is arranged to be still further elevated by a pair of tertiary selector bars 42. Accordingly, the primary carrier and its selector bars correspond, collectively, to the primary order of a system of classification and, individually, to the several digits in that primary order; the secondary carrier and its selector bars correspond, collectively, to the secondary order, and, separately, to the different digits in that order; and the selector elements and the tertiary selector bars correspond, collectively, to the tertiary order, and separately, to the different digits in that order.

Upon the depression of any key as a primary key, a selected primary carrier is elevated to isolate a group of selector elements. This renders effective for cooperation the secondary carriers on that primary carrier. Accordingly, upon depression of any selected key as a secondary key, the corresponding secondary carrier on the previously selected primary carrier is still further elevated, to further isolate the selected division or unit in the previously selected group of elements; this renders effective for cooperation the elements on that secondary carrier with the tertiary selector bars. Accordingly, upon depression of any desired key as the tertiary key, the corresponding selected elements are still further elevated, to further isolate from the previously isolated division or unit a pair of selected elements.

It is sometimes desirable to retain the shifted or isolated cards in isolated positions, especially where a series of cards in a tray are successively isolated, as when the auditor selects a number of accounts from a list, which are to be picked out and the data taken therefrom, as from the top lines thereof. Now it will be noted that with the retaining means provided for latching the plungers 76 (forming supporting elements cooperating with the cards) each pair of plungers upon elevation will be retained in elevated position. Accordingly, a series of cards may be isolated, from a given list, and retained in isolated or selected relation, even though the selecting means is restored successively after the successive selections. If, however, the selection of a series of cards in a given tray has thus been effected, the isolated cards may be restored to normal positions, by withdrawing the restoring means by pulling forward on a handle 87, which will concurrently trip all of the plungers which are retained in elevated positions.

Figure 9:
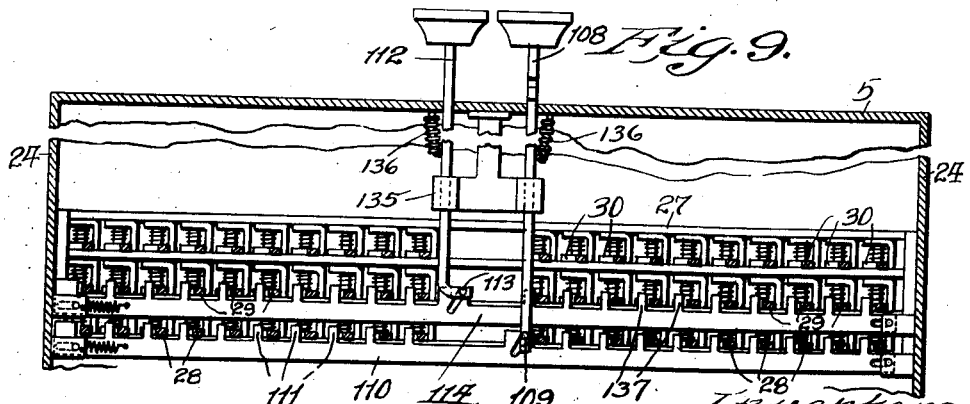
Figure 9 is a fragmentary transverse section taken on the line IX—IX of Figure 2.

From the aforesaid description of this improved selecting device relative to indexing cards, in which the procedure towards finding a particular or desired card is a procedure of elimination, it is to be seen that the first step is to eliminate the mechanisms pertaining to nine hundred cards, and in the next instance to eliminate the mechanisms pertaining to ninety cards, and in a third and last instance, by the third key operation to eliminate nine mechanisms out of ten mechanisms, so that the remaining one mechanism relative to one index card can be actuated. Incidental to the aforesaid, provision has also been made whereby an accounting or checking up of all of the one thousand cards can be expeditiously carried out, in other words, if it is desired to inspect all of the cards, means are provided whereby it is not necessary to have three key actuations relative to the producing of a single card. In this connection, attention is called to Fig. 9 which relates to the rows of triggers 28, 29 and 30, respectively, said triggers being operably related to the selector bars 32, 37 and 42, respectively, in which means are provided for simultaneously tripping all of the lowermost row of triggers 28 and the intermediate row of triggers 29. This is brought about by first depressing the releasing member 108, in which the pin 109, carried by said member 108 will thrust the tripping bar 110 to one side, thereby causing the fingers 111 carried thereby to release all of the lowermost triggers 28 from engagement with their respective selector bars 32, thereby elevating all of the plunger-supporting members 63, in which are carried the plungers 64. The releasing of the selector bars 32 will automatically withdraw the resetting bar 51 and filling members 55, thereby allowing the plunger carrier 21 to travel upwardly.

In order to release the intermediate set of tripping members 29, the releasing member 112 is depressed, and the pin 113 carried thereby will cause the tripping bar 114 to simultaneously release all of the triggers 29, thereby releasing all of the selector bars 37, thereby further elevating all of the plunger carriers 63 pertaining to the mechanisms that are capable of actuating on the set of one thousand cards.

In this connection, the pins 92 of the plungers 64 will be brought into engagement with respective throats 46 of the parallel members 45 of the selector bars 42. As the selector bars 37 were moved rearwardly, they incidentally carried the resetting member 52 and filling members 56 therewith, thereby allowing the plunger carrier 21 to be elevated further, in which the plungers thereof are in a horizontal plane with the uppermost set of triggers 30, and in view of the fact that all of the engaging pins of the plungers 34 have been brought into a position of engagement with all of the throats 46, of all of the selector bars 42, the numeral keys when operated upon are in a position to act directly on the super-plungers, thereby elevating all of the cards as follows: If it is desired to inspect all of the cards having numbers ending with nine, then the nine numeral key when operated upon will elevate all of said cards ending with figure nine, of which there are one hundred, on account of the fact that the nine numeral key when operated upon will actuate a pair of plungers 25, thereby actuating a pair of the uppermost triggers 30, thereby releasing a pair of the uppermost selector bars 42 pertaining to the nine numeral key, and inasmuch as all of the pins of the plungers 64 relating to the index cards ending with figure nine are in a position of engagement with the throats of the selector bars operated by the numeral key nine, all of the cards ending with the figure nine will be elevated. This operation therefore necessarily follows pertaining to the finding of all of the cards ending with the figure eight, in which the numeral key eight is operated and so on pertaining to the finding of all of the cards of one thousand cards ending with the figures seven, six, five, etc.

Therefore it is to be seen that in order to audit all of the cards of the one-thousand cards, it is not necessary to have three key-actuations for each card, as the mechanisms pertaining to all of the selector bars 32 and 37 can be actuated by the manipulation of the releasing members 108 and 112, thereby allowing the plunger carrier 21 to be raised to a position of actuating alinement with the uppermost set of triggers 30, said triggers being relevant to the uppermost set of selector bars 42.

To further assist the auditing and posting of the index cards, it is preferable to number each pilot card relative to its compartment or pack of ten cards which it is adapted to control. As afore related, since this improved indexing system pertains to the indexing of one-thousand cards, it is therefore seen that there will be one-hundred pilot cards, there being ten pilot cards to each set of one-hundred index cards. In this connection, it can be assumed that ten of the cards pertaining to one-hundred cards will have a designating number pertaining to a particular one-hundred set of cards such as, for instance, in the two-hundred section, the lowest order of pilot card in said section could be marked two as pertaining to two-hundred and cipher as pertaining to the cipher compartment, in other words, the reference on this particular pilot card would be 2—0, said pilot card controling the ten cards in which the terminal numbers thereof are cipher, one, two and so on to nine. The succeeding pilot cards in this section as to the succeeding sets of ten cards would be numbered 2—1, 2—2, to 2—9. Attention is called to Fig. 6, in which the first card in the two-hundred section is numbered two-hundred, said number being visible over the side recess 115, which is formed in the preceding pilot card 7.

From the aforesaid, it necessarily follows that if card 210 were placed in the cipher compartment, said card would be immediately noted or checked on account of its not comparing with the pilot card designated as 2—0. It is therefore seen that this manner of marking the pilot cards as pertaining to their respective compartments of ten cards provides for the finding of misplaced cards.

Figure 17:
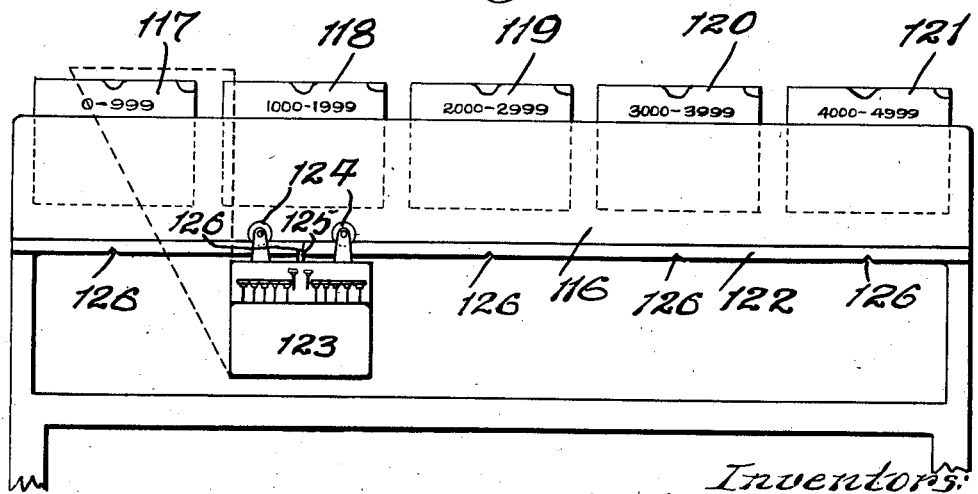
Figure 17 is a front elevation of a cabinet disclosing a series of card holding receptacles and showing this improved card selecting device movably mounted so that the selecting device can be shifted to an operating position relative to acting on any one of the card holding receptacles.

Referring now to Fig. 17, in which is shown a cabinet 116, said cabinet serves as a depository for a plurality of sets of one-thousand cards 117, 118, 119, 120 and 121, respectively, and arranged beneath said cabinet and on a trackway 122 is an operable selecting device 123, said device being hung from rollers 124 which are mounted on the trackway 122, said portable selecting device having a stopping mechanism 125 which is adapted to be engaged in notches 126, each of said notches relating to a set of one-thousand cards. In this arrangement of a plurality of sets of one-thousand cards, the one selecting device is capable of being shifted to a position whereby the mechanism contained therein will be operable towards selecting any desired card or cards from any of the one-thousand sets, the requirement of a plurality of sets of cards being obvious. This multiple tray structure is fully described and claimed in our copending application, Serial Number 229,996.

Referring again to Fig. 17, since the selecting device 123 is movably mounted on a trackway relative to operating on the plurality of sets to one thousand cards, in order to further facilitate the working of the system, a table or rest is carried by said selecting device 123, said table being shown in dotted lines in said figure, and is adapted to overlap the cabinet 116. In this way the table will be helpful to the operator in listing the items on index cards that he might select from the cabinet.

Attention is again called to Fig. 16 which shows a set of index cards 80, each having a pair of abutting portions 93 extending from the lower edge thereof, each abutting portion of each card being arranged at equal distances from the center of the card, each pair of portions as afore related being essential relative to proper operation of a pair of superplungers 76 on each card. This arrangement of pairs of properly spaced abutting portions of a card is also for the purpose of providing an index card which can be turned around after being removed from its cabinet so that items can be listed on the opposite side of the card. In this connection it is to be noted that index cards provided with the arrangement of abutting portions 93 as just related can be reentered in the cabinet in reverse position, and the abutting portions 93 thereof will be in proper engaging alinement with their respective superplungers 76.

It is obvious that various changes may be made in the details of construction without departing from the spirit of this invention; it is to be understood, therefore, that this invention is not to be limited to the specific details shown and described.

Having thus described the invention, what is claimed is:

1. An apparatus for finding accounts, comprising, selector elements, means for selecting a group of said elements, and means for selecting a division of such group.

2. An apparatus for finding accounts, comprising, selector elements, means for selecting a group of said elements, means for selecting a division of such group, and means for selecting an element of such division.

3. An apparatus for finding accounts, comprising, selector elements, means for selecting a unit of said elements, and means for selecting an element of such unit.

4. An apparatus for finding accounts, comprising, selector elements arranged in groups and divisions of such groups, and selective manipulative means adapted to effect selection of said elements.

5. An apparatus for finding accounts, comprising, selector elements arranged in groups, divisions of such groups and elements of such divisions, and selective manipulative means adapted to effect selection of said elements.

6. An apparatus for finding accounts, comprising, selector elements arranged in groups and divisions of such groups, and selective manipulative means adapted to effect successively group and division selection of said elements.

7. An apparatus for finding accounts, comprising, selector elements arranged in groups, divisions of such groups and elements of such divisions, and selective manipulative means adapted to effect successively group, division and element selection of said elements.

8. An apparatus for finding accounts, comprising, selector elements arranged in groups and divisions thereof, in accordance with the orders of a given system of classification.

9. An apparatus for finding accounts, comprising, selector elements arranged in groups, divisions of such groups and elements of such divisions, in accordance with the orders of a given system of classification.

10. An apparatus for finding accounts, comprising, selector elements arranged in units and elements thereof, in accordance with the orders and digits of a given system of classification.

11. An apparatus for finding accounts, comprising, selector elements, means for isolating a group of said elements, and means for isolating a division of such group.

12. An apparatus for finding accounts, comprising, selector elements, means for isolating a group of said elements, means for isolating a division of such group, and means for isolating an element of such division.

13. An apparatus for finding accounts, comprising, selector elements, means for isolating a unit of said elements, and means for isolating an element of such unit.

14. An apparatus for finding accounts, comprising, selector elements, and selective manipulative means adapted to select successively a group of said elements and a division of such group.

15. An apparatus for finding accounts, comprising, selector elements, and selective manipulative means adapted to select successively a group of said elements, a division of such group and an element of such division.

16. An apparatus for finding accounts, comprising, selector elements, and selective manipulative means adapted to select successively a unit of said elements and an element of such unit.

17. An apparatus for finding accounts, comprising, selector elements, means for selecting a unit of said elements, and means rendered effective upon such selection adapted to select an element of such unit.

18. An apparatus for finding accounts, comprising, selector elements, means for selecting a group of said elements, and means rendered effective upon such selection adapted to select a division of such group.

19. An apparatus for finding accounts, comprising, selector elements, means for selecting a group of said elements, means rendered effective upon such group selection adapted to select a division of such group, and means rendered effective upon such division selection adapted to select an element of such division.

20. An apparatus for finding accounts, comprising, selector elements, and selective manipulative means adapted to select a unit of said elements and render effective for selection the elements of such unit.

21. An apparatus for finding accounts, comprising, selector elements, and selective manipulative means adapted to select a group of said elements and render effective for selection the divisions of such group.

22. An apparatus for finding accounts, comprising, selector elements, selective manipulative means adapted to select a group of said elements and render effective for selection the divisions of such group, and means cooperating with said selective manipulative means adapted to select a division and render effective for selection the elements of such divisions.

23. An apparatus for finding accounts, comprising, selector elements, and means for selecting a unit of said elements adapted to render effective for selection an element of such unit.

24. An apparatus for finding accounts, comprising, selector elements, and means for selecting a group of said elements adapted to render effective for selection a division of such group.

25. An apparatus for finding accounts, comprising, selector elements, means for selecting a group of said elements adapted to render effective for selection a division of such group and means for selecting a division adapted to render effective for selection the elements of such division.

26. An apparatus for finding accounts, comprising, selector elements, means for selecting a group of said elements adapted to render effective for selection a division of such group, and means for selecting a division adapted to render effective for selection an element of such division.

27. An apparatus for finding accounts, comprising, selector elements, means for selecting a unit of said elements adapted to render effective for selection an element of such unit, and means for selecting such element.

28. An apparatus for finding accounts, comprising, selector elements, means for selecting a group of said elements adapted to render effective for selection a division of such group, means for selecting a division adapted to render effective for selection an element of such division, and means for selecting such element.

29. An apparatus for finding accounts, comprising, selector elements, means for selecting a unit of said elements adapted to render effective for selection the elements of such unit, and means for selecting a desired element of such unit.

30. An apparatus for finding accounts, comprising, selector elements, means for selecting a group of said elements adapted to render effective for selection the divisions of such group, and means for selecting a desired division of such group.

31. An apparatus for finding accounts, comprising, selector elements, means for selecting a group of said elements adapted to render effective for selection the divisions of such group, and means for selecting a desired division of such group adapted to render effective for selection the elements of such division.

32. An apparatus for finding accounts, comprising, selector elements, means for selecting a group of said elements adapted to render effective for selection the divisions of such group, means for selecting a desired division of such group adapted to render effective for selection the elements of such division, and means for selecting a desired element of such division.

33. An apparatus for finding accounts, comprising, a primary carrier, a series of secondary carriers thereon, and selector elements on said secondary carriers.

34. An apparatus for finding accounts, comprising, a series of primary carriers, a series of secondary carriers on each of said primary carriers, and selector elements on said secondary carriers.

35. An apparatus for finding accounts, comprising, a series of primary carriers, a series of secondary carriers on each of said primary carriers, and a series of tertiary selector elements on each of said secondary carriers.

36. An apparatus for finding accounts, comprising, a primary carrier, and a series of secondary selector element carriers mounted for elevation by said primary carrier.

37. An apparatus for finding accounts, comprising, a series of primary carriers, and a series of secondary selector element carriers mounted for elevation by each of said primary carriers.

38. An apparatus for finding accounts, comprising, a support, a series of carriers mounted for elevation on said support, and selector elements mounted for elevation on said carriers.

39. An apparatus for finding accounts, comprising, a support, a series of primary carriers mounted for elevation by said support, and a series of secondary selector element carriers mounted for elevation on each of said primary carriers.

40. An apparatus for finding accounts, comprising, a support, a series of primary carriers mounted for elevation on said support, a series of secondary carriers mounted for elevation by each of said primary carriers, and a series of selector elements mounted for elevation on each of said secondary carriers.

41. An apparatus for finding accounts, comprising, primary selecting means, secondary selecting means, and means adapted upon operation of said primary means to render effective said secondary means.

42. An apparatus for finding accounts, comprising, primary selecting means, secondary selecting means, tertiary selecting means, means adapted upon operation of said primary means to render effective said secondary means, and means adapted upon operation of said secondary means to render effective said tertiary means.

43. An apparatus for finding accounts, comprising, selector elements arranged in units, unit selecting means, and means rendered effective by said unit selecting means adapted to effect selection of an element.

44. An apparatus for finding accounts, comprising, selector elements arranged in groups and divisions of the respective groups, group selecting means, and means rendered effective by said group selecting means adapted to effect selection of a division.

45. An apparatus for finding accounts, comprising, selector elements arranged in groups and divisions of the respective groups, group selecting means, division selecting means, and means adapted upon operation of said group selecting means to render effective said division selecting means.

46. An apparatus for finding accounts, comprising, selector elements arranged in groups and divisions of the respective groups, group selecting means, division selecting means, element selecting means, means adapted upon operation of said group selecting means to render effective said division selecting means, and means adapted upon operation of said division selecting means to render effective said element selecting means.

47. An apparatus for finding accounts, comprising, selector elements arranged in units, means for selecting the units, and means effective upon selection of a desired unit adapted to select a desired element thereof.

48. An apparatus for finding accounts, comprising, selector elements arranged in groups and divisions of the respective groups, means for selecting the groups, and means effective upon selection of a desired group adapted to select a desired division thereof.

49. An apparatus for finding accounts, comprising, selector elements arranged in groups and divisions of the respective groups, means for selecting the groups, means effective upon selection of a desired group adapted to select a desired division thereof, and means effective upon selection of a desired division adapted to select a desired element thereof.

50. An apparatus for finding accounts, comprising, selector elements arranged in groups and divisions of the respective groups, and primary and secondary selecting means for the respective groups and divisions.

51. An apparatus for finding accounts, comprising, selector elements arranged in groups and divisions of the respective groups, and primary, secondary and tertiary selecting means for the respective groups, divisions and elements.

52. An apparatus for finding accounts, comprising, selector elements arranged in groups and divisions of the respective groups, means adapted to isolate a desired group, and means adapted to further isolate a desired division of such group.

53. An apparatus for finding accounts, comprising, selector elements arranged in groups and divisions of the respective groups, means adapted to isolate a desired group, means adapted to further isolate a desired division of such group, and means adapted to further isolate a desired element of such division.

54. An apparatus for finding accounts, comprising, selector elements arranged in groups and divisions of the respective groups, group selecting means corresponding to the groups, and division selecting means corresponding to the divisions.

55. An apparatus for finding accounts, comprising, selector elements arranged in groups and divisions of the respective groups, group selecting means corresponding to the groups, division selecting means corresponding to the divisions, and element selecting means corresponding to the elements of the divisions.

56. An apparatus for finding accounts, comprising, a support, a primary carrier mounted for movement thereon, a secondary selector element carrier mounted for movement by said primary carrier, and primary and secondary means adapted to move said respective carriers.

57. An apparatus for finding accounts, comprising, a support, a primary carrier mounted for movement thereon, a secondary carrier mounted for movement by said primary carrier, selectors mounted for movement on said secondary carrier, and primary, secondary and tertiary means adapted to move said respective carriers and said elements.

58. An apparatus for finding accounts, comprising, a support, a series of carriers mounted for movement on said support, a series of selectors mounted for movement on each carrier, means for selectively moving said carriers, and means for selectively moving said elements.

59. An apparatus for finding accounts, comprising, a support, a series of primary carriers mounted for movement on said support, a series of secondary selector element carriers mounted for movement by each of said primary carriers, means for selectively moving said primary carriers, and means for selectively moving said secondary carriers.

60. An apparatus for finding accounts, comprising, a support, a series of primary carriers mounted for movement on said support, a series of secondary carriers mounted for movement by each of said primary carriers, a series of selector elements mounted for movement on each of said secondary carriers, means for selectively moving said primary carriers, means for selectively moving said secondary carriers, and means for selectively moving said selectors.

61. In an apparatus for finding accounts, having elements to be selected, means for isolating a unit of said elements, and means for isolating an element of the isolated unit.

62. In an apparatus for finding accounts, having elements to be selected, arranged in groups and divisions thereof, means for isolating a group of said elements, and means for isolating an assembled division of the isolated group.

63. In an apparatus for finding accounts, having elements to be selected, means for isolating a group of said elements, means for isolating a division of the isolated group, and means for isolating an element of the isolated division.

64. In an apparatus for finding accounts, having elements to be selected, means for isolating a unit of said elements, and means thereafter effective for isolating an element of the isolated unit.

65. In an apparatus for finding accounts, having elements to be selected arranged in groups and divisions thereof, means for isolating a group of said elements, and means thereafter effective for isolating an assembled division of the isolated group.

66. In an apparatus for finding accounts, having elements to be selected, means for isolating a group of said elements, means thereafter effective for isolating a division of the isolated group, and means thereafter effective for isolating an element of the isolated division.

67. In an apparatus for finding accounts, having elements to be selected, selective manipulative means for isolating a desired unit of said elements, and means for isolating an element of the isolated unit.

68. In an apparatus for finding accounts, having elements to be selected arranged in groups and divisions thereof, selective manipulative means for isolating a desired group of said elements, and means for isolating a desired assembled division of the isolated group.

69. In an apparatus for finding accounts, having elements to be selected, selective manipulative means for isolating a desired group of said elements, means for isolating a desired division of the isolated group, and means for isolating a desired element of the isolated division.

70. In an apparatus for finding accounts, having elements to be selected, means for elevating an assembled series of said elements, and means for still further elevating an element of such series.

71. In an apparatus for finding accounts, having elements to be selected arranged in groups and divisions thereof, means for elevating a group of said elements, and means for still further elevating an assembled division of such group.

72. In an apparatus for finding accounts, having elements to be selected, means for elevating a group of said elements, means for still further elevating a division of such group, and means for still further elevating an element of such division.

73. An apparatus for finding accounts, comprising, selector elements, means for moving groups of said elements, means for further moving divisions of such groups, and means for selecting corresponding elements of such divisions.

74. An apparatus for finding accounts, comprising, selector elements, and selective manipulative means adapted to move successively groups of said elements and divisions of such groups, and to select corresponding elements of such divisions.

75. An apparatus for finding accounts, comprising, selector elements, means for moving groups of said elements, means rendered effective upon such group moving, adapted to further move divisions of such groups, and means rendered effective upon such division moving adapted to select corresponding elements of such divisions.

76. A selecting device for a plurality of accounting cards comprising an operating key, a card-moving member operably related to said key, a plurality of cards arranged among said first-mentioned cards having like identifying portions, said key when actuated adapted to move one of the said cards bearing a like identifying portion from among said plurality of like cards.

77. A selecting device for a plurality of accounting cards arranged in groups, each card of each group having a different identifying portion than an adjacent card of its group, a selecting member for selecting a group of cards from said other groups relative to finding a certain card of a certain group of cards, an operating key for operating said selecting member, a plurality of card-moving members operably related to said selecting member, a second selecting member operably related to said key for selecting one of said card-moving members, and means cooperable with said key for actuating said selected card-moving member and moving one card of said selected group of cards.

78. In a selecting device of the character described, a plurality of reciprocally mounted card-actuating members, a group of cards to be actuated by said members, a selecting mechanism operably related to all of said members, a second selecting mechanism operably related to said first-mentioned mechanism, means for operating said selecting mechanisms, said last-mentioned selecting mechanism when operated adapted to actuate said first-mentioned mechanism, whereby when the first-mentioned selecting mechanism is operated it selects a card-actuating member for moving one card of said group of cards.

79. In a selecting device, a plurality of selector bars arranged in rows, and a movably mounted actuating mechanism adapted to be placed in operating alinement with the different rows of selector bars.

80. In a selecting device, a group of movably mounted cards, a pair of abutting portions formed on each of said cards, each pair of abutting portions of each card being offset from the abutting portions of an adjacent card, a pair of reciprocally mounted members for engagement with each pair of abutting portions of each card, arranged beneath said cards and at right angles thereto, a plunger for engagement with each of said members, a selecting bar for placing a pair of said plungers in position for engagement with a pair of said members, and means for causing said selected plungers to engage their respective members and move one of said cards.

81. In a selecting device, a plurality of movably mounted cards, a pilot card located among said cards, an abutting portion formed on each of said cards, the abutting portion of each card being offset from the abutting portions of the other cards, an actuating member for the abutting portion of each card, and means operably related to each actuating member for moving it with its respective card and also moving said pilot card.

82. The method of selecting a desired card from a plurality of cards, which consists of eliminating mechanisms against actuation which pertain to the moving of the majority of the cards, then eliminating other mechanisms against actuation as pertaining to the moving of all but one of the remaining cards, then finally actuating the mechanism pertaining to the moving of the remaining card.

83. An apparatus of the character described, comprising a card tray, means for effecting selection of a desired card, selective manipulative means for controlling said first means, and means independent of said second means for maintaining such selection.

84. An apparatus of the character described, comprising a card tray, means for effecting selection of a desired card, selective manipulative means for controlling said first means, and means independent of said second means for maintaining such card in selected relation.

85. An apparatus of the character described, comprising a card tray, means for effecting selection of a desired card, selective manipulative means for controlling said first means, and means for maintaining such selection while said selective manipulative means is restored to normal condition.

86. An apparatus of the character described, comprising a card tray, means for isolating a selected card, selective manipulative means for controlling said first means, and means independent of said second means for maintaining such card isolated.

87. An apparatus of the character described, comprising a card tray, means for isolating a selected card, selective manipulative means for controlling said first means, and means for maintaining such isolation while said isolating means is restored to normal condition.

88. An apparatus of the character described, comprising a card tray, means for isolating a selected card, selective manipulative means for controlling said first means, and means for maintaining such isolation after said isolating means is restored to normal condition.

89. An apparatus of the character described, comprising, a card tray, means for effecting selection and displacement of a desired card, means for maintaining such card in displaced relation, and means for restoring such selected card to normal position.

90. An apparatus of the character described, comprising a card tray, means for effecting selection of a desired card, means for maintaining such selection while a part of said selecting means is restored to normal condition, and means for restoring said maintaining means to normal condition.

91. An apparatus of the character described, comprising a card tray, means for isolating a card, means for maintaining such card isolated, and means for restoring such isolated card to normal condition.

92. An apparatus of the character described, comprising a card tray, means for isolating a card, means for maintaining such card isolated after a part of said isolating means is restored to normal condition, and means for restoring said maintaining means to normal condition.

93. An apparatus of the character described, comprising a card tray, means for effecting selections of a series of cards, selective manipulative means for controlling said first means, and means independent of said second means for maintaining such selections.

94. An apparatus of the character described, comprising a card tray, means for effecting successive selections of a series of cards, selective manipulative means for controlling said first means, and means independent of said second means for maintaining such selections.

95. An apparatus of the character described, comprising a card tray, means for effecting successive selections of a series of cards, and means operating upon such selections for maintaining such selections while a part of said selecting means is restored to normal condition between successive selections.

96. An apparatus of the character described, comprising a card tray, means for effecting successive selections of a series of cards, and for restoring a part of said selecting means to normal condition between successive selections, and means for maintaining such selections.

97. An apparatus of the character described, comprising a card tray, means for effecting successive selections of a series of cards, means for maintaining such selections, and means for restoring said maintaining means to normal condition.

98. An apparatus of the character described, comprising a card tray, means for effecting successive selections of a series of cards and for restoring a part of said selecting means to normal condition between successive selections, means for maintaining such selections, and means for restoring said maintaining means to normal condition.

99. An apparatus of the character described, comprising a card tray, means for isolating a series of cards, selective manipulative means for controlling said first means, and means independent of said second means for maintaining such isolations.

100. An apparatus of the character described, comprising a card tray, means for isolating a series of cards, selective manipulative means for controlling said first means, and means independent of said second means for maintaining such cards isolated.

101. An apparatus of the character described, comprising a card tray, means for isolating a series of cards, means for restoring said isolating means to normal condition between successive isolations, selective manipulative means for controlling said first means, and means independent of said selective manipulative means for maintaining such isolations.

102. An apparatus of the character described, comprising a card tray, means for isolating a series of cards, means for maintaining such isolations, and means for restoring the isolated cards to normal condition.

103. An apparatus of the character described, comprising a card tray, means for isolating a series of cards, means for concurrently maintaining a series of cards isolated, and means for concurrently releasing said latter means for restoring said cards to normal position.

104. An apparatus of the character described, comprising a card tray, means for effecting successive selections of a series of cards and for restoring said selecting means to normal condition between successive selections, and means for maintaining such selections as they are successively effected.

105. An apparatus of the character described, comprising a card tray, means for effecting successive selections of a series of cards and for restoring said selecting means to normal condition between successive selections, means for maintaining such selections as they are successively effected, and means for concurrently restoring such selections to normal condition.

106. An apparatus of the character described, comprising a card tray, card-selecting means, means for operating said selecting means for isolating successively a series of cards and for restoring said selecting means to normal condition between successive isolations, and means for retaining the cards as they are isolated.

107. An apparatus of the character described, comprising a card tray, selecting means for isolating successively a series of cards, means for restoring said selecting means to normal condition between successive isolations, means for retaining the cards as they are isolated, and means for restoring the isolated cards to normal condition.

108. An apparatus of the character described, comprising a card tray, selecting means for isolating successively a series of cards, means for restoring said selecting means to normal condition between successive isolations, means for retaining the cards as they are isolated, and means for restoring all of the isolated cards in the tray to normal condition.

109. An apparatus of the character described in which selecting means locates a card and isolates the same, characterized by means operating upon such isolation for retaining the isolated card after a part of the selecting means is restored.

110. An apparatus of the character described in which selecting means locates a unit of cards and then locates and isolates a card in the located unit, characterized by means for retaining the isolated card after a part of the selecting means is restored to normal condition.

111. An apparatus of the character described in which selecting means locates a group of cards, a division of the located group and then locates and isolates a card in the located division, characterized by means for retaining the isolated card after a part of the selecting means is restored to normal condition.

112. An apparatus of the character described in which selecting means locates and isolates successively a series of cards, characterized by means for retaining the isolated cards as they are isolated.

113. An apparatus of the character described in which selecting means locates and isolates successively a series of cards, characterized by means for retaining the isolated cards as they are isolated and after a part of the selecting means is restored to normal condition after each such isolation.

114. An apparatus of the character described in which selecting means isolates successively a series of cards after primary and secondary locations, characterized by means for retaining each isolated card after a part of the selecting means is restored to normal condition.

115. An apparatus of the character described in which selection means isolates successively a series of cards after primary, secondary and tertiary locations, characterized by means for retaining each isolated card after a part of the selecting means is restored to normal condition.

116. An apparatus of the character described, comprising a card tray, means for effecting selection of a desired card, and means operating upon such selection for maintaining such selection while said selecting means is restored to normal condition.

117. An apparatus of the character described, comprising a card tray, card selecting means, means for isolating a selected card, and means operating upon such isolation for maintaining such isolation while said isolating means is restored to normal condition.

118. An apparatus of the character described, comprising, a card tray, card-supporting elements, selecting means for shifting said elements, and means for retaining said elements in shifted position.

119. An apparatus of the character described, comprising, a card tray, elements adapted to cooperate with the cards, selecting means for shifting said elements, and means for retaining said elements in shifted condition.

120. An apparatus of the character described, comprising, a card tray, card-supporting elements, selecting means for shifting said elements, means for retaining said elements in shifted condition, and means for releasing said retaining means.

121. An apparatus of the character described, comprising, a card tray, elements for shifting the cards, selecting means for shifting said elements, means for retaining said elements in shifted condition, and means for releasing said elements.

122. In a card finding and separating device, a receptacle containing a plurality of cards, card-moving means having relatively movable parts for lifting a desired card of the plurality of cards, and means for engaging certain of said parts so as to uphold said card after others of said parts have been returned to their former position.

123. In a sorting device, a plurality of selectable elements, a plurality of selecting elements, means for actuating said selecting elements, means for holding said elements in their actuated positions, and means for releasing said holding means.

124. In a sorting device, a plurality of elements having selective characteristics, permutation devices adapted to cooperate with characteristic portions of said elements, means for selectively actuating said permutation devices, means for holding said devices in their actuated positions, and means for releasing said holding means.

125. In a card finding and separating device, a receptacle containing a plurality of upright cards, means for successively elevating any of said cards to positions wherein the upper edges thereof are above said other cards, and means for simultaneously returning all of the elevated cards to their neutral positions.

LUTHER A. WATTERS.
SAMUEL F. LLOYD.

CERTIFICATE OF CORRECTION.

Patent No. 1,731,281.                                                           Granted October 15, 1929, to

LUTHER A. WATTERS ET AL.

It is hereby certified that error appears in the printed specification of the above numbered patent requiring correction as follows: Page 1, line 26, for the word "movement" read "movements"; page 6, line 110, after the word "same" insert the word "to"; page 9, line 120, for the numeral "7" read "77"; page 12, line 16, claim 39, for "by" read "on"; and line 18, for "on" read "by"; page 14, line 120, claim 88, for "isolation" read "card isolated"; page 16, line 70, claim 118, for "position" read "condition"; same page, lines 84 and 85, claim 121, strike out the words "for shifting" and insert instead "adapted to cooperate with"; and that the said Letters Patent should be read with these corrections therein that the same may conform to the record of the case in the Patent Office.

Signed and sealed this 3rd day of December, A. D. 1929.

(Seal)                                                                 M. J. Moore,
                                                                           Acting Commissioner of Patents.